Fritz Ostwald
Leopold F. Schmid
Walter Heusinkveld
INVENTORS.

BY

Karl G. Ross
Attorney

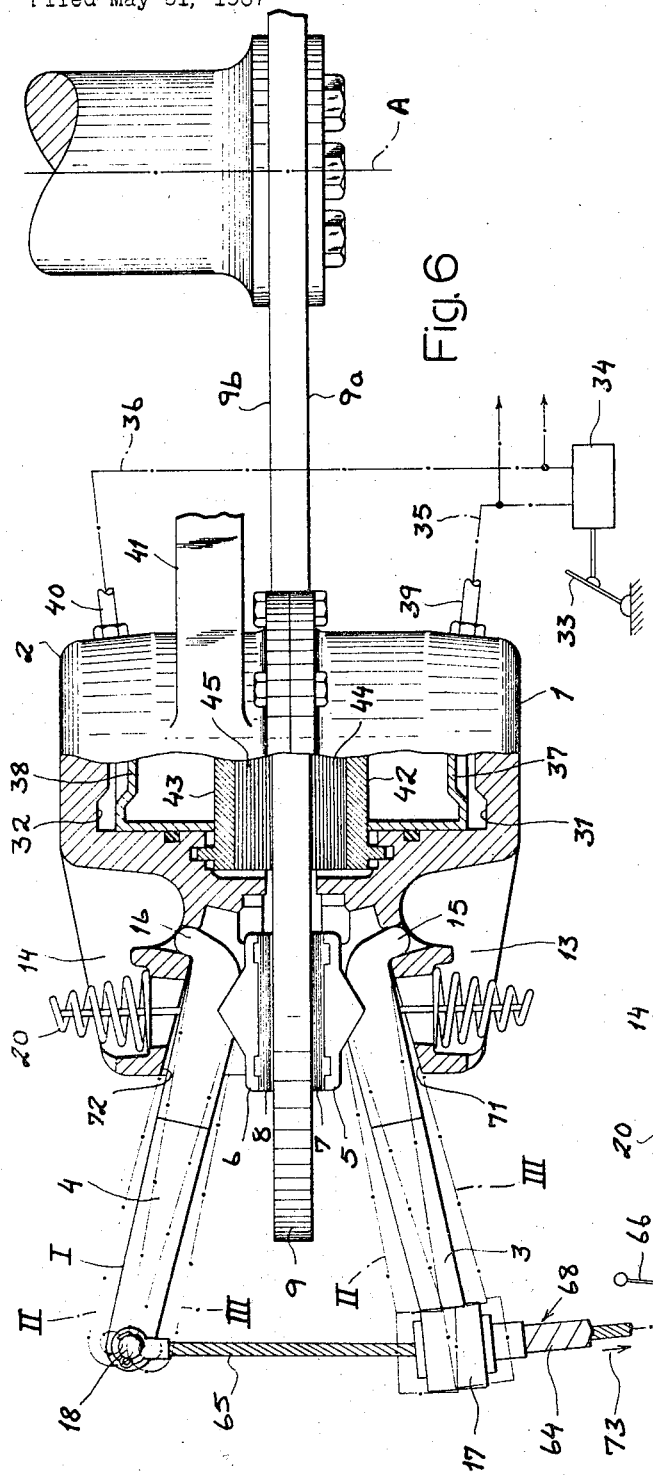
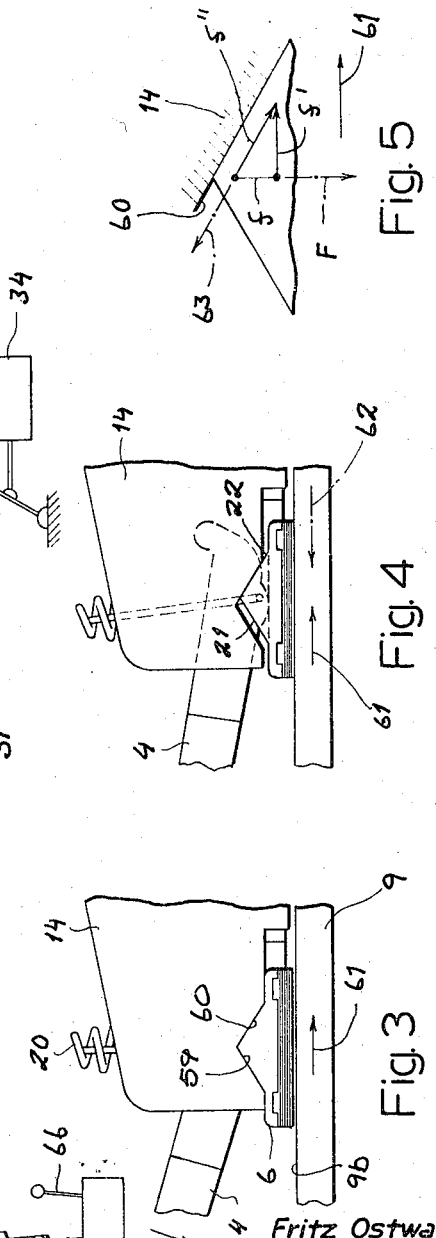

United States Patent Office 3,424,278
Patented Jan. 28, 1969

3,424,278
MECHANICALLY OPERABLE DISK BRAKE
Fritz Ostwald, Buchschlag, Leopold Franz Schmid, Stuttgart, and Walter Heusinkveld, Frankfurt, Germany, assignors to Alfred Teves Maschinen- und Armaturenfabrik KG., Frankfurt am Main, Germany, a corporation of Germany
Filed May 31, 1967, Ser. No. 642,398
Claims priority, application Germany, June 25, 1966, T 31,455
U.S. Cl. 188—73         5 Claims
Int. Cl. F16d 55/224, 65/30

ABSTRACT OF THE DISCLOSURE

An auxiliary mechanical brake mounted in the yoke of a hydraulic or pneumatic main brake for automotive vehicles in which the auxiliary brakeshoes have inclined-plane surfaces engaging corresponding surfaces formed directly in the brake-support yoke so that the brakeshoes are wedged against the brake disk by this support. The brakeshoes are actuated by a pair of levers which form a four-point floating linkage with respect to the housing, all sides of the four-point linkage being of constant length for a given separation of the free ends of the actuating levers.

---

Our present invention relates to disk brakes of the type wherein a rotatable brake disk, usually connected to a shaft or the like, is embraced over a sector by a brake support or yoke carrying a pair of brakeshoes which are shiftable toward and away from the brake disk by fluid-responsive and/or manually operable actuating means. More particularly, the present invention relates to a manually actuatable or mechanically operable auxiliary disk brake for a brake system of this general type.

It has already been proposed to provide, on a disk-brake yoke or brake support, one or more levers which may be tied to an actuating lever in the region of the operator seat of an automotive vehicle by a flexible cable or the like, the lever controlling at least one but generally a pair of brakeshoes adapted to engage the disk as a parking brake, locking brake or emergency brake independently of the hydraulic or pneumatic devices which are operated by the brake panel and the master cylinder during normal vehicle travel. The brakeshoes in both cases are shiftable in a direction perpendicular to the braking faces of the disk and may be of the self-reinforcing type. The terms "self-reinforcing brake" and "self-tightening brake" are used herein to designate a brake construction in which, when the brakeshoe engages the moving braking face of the disk there is entrainment of the brakeshoe in a wedging, camming or toggle-like action to increase the force with which the shoe is applied against this surface. In one system of this general type, roller elements are provided between the brakeshoe and an actuating bar or lever, the roller elements riding in camming recesses in the bar and/or the shoe. When the shoe engages the moving brake surface, it shifts relatively to the bar and the roller elements cam the shoe against the surface with augmented force, i.e. a force component determined by the angle of attack of the cam and the entrainment force. In another arrangement of this general type, the brakeshoe and a pressure plate on the actuating system have complementarily inclined-plane formations along which the shoe may ride so that the shoe is wedged against the moving brake surface upon its entrainment therewith. Such "self-reinforcing" systems have been found to be somewhat ineffective in hand-operated or mechanical braking systems and especially such systems as are used as auxiliary brakes to hydraulic or pneumatic brake devices because of the reaction effect on the actuating means.

Furthermore, the self-reinforcing systems proved to be comparatively expensive and complicated so that widespread use of self-reinforcing brake devices in mechanically operated auxaliary brakes has not occurred.

It is, therefore, the principal object of the present invention to provide an improved disk-brake arrangement having mechanically actuatable brakeshoes which engage a brake disk with self-reinforcing action but are free from the disadvantages enumerated above.

Another object of this invention is to provide an improved mechanically operable, flexible-cable-actuation disk brake as an auxiliary to a fluid-operated brake, which is highly effective, relatively simple and of inexpensive construction.

We have now found that these objects can be attained in a disk brake of this type when the brakeshoes have backing plates in inclined-plane relationship directly with the brake support or housing while the actuating means is formed by a pair of levers, independent of the self-tightening action between these backing plates and respective portions of the brake yoke or housing.

According to an important feature of this invention, the brake housing or support and the brakeshoes are provided with co-operating and directly-engaging cam surfaces for wedging the brakeshoe against the respective surface of the disk when the actuating lever urges the brakeshoe against the disk for frictional entrainment therewith. Spring means acts upon each brakeshoe and is seated against the brake housing or support for restoring the brakeshoes to an initial position with respect to the camming surfaces when the levers are released, the camming ramps being dimensioned such that a strong self-tightening action is provided when the brakeshoes are frictionally entrained with the disk but are incapable of blocking return of the brakeshoes along the camming ramps when the levers are released. By providing that the brakeshoes bear directly against the housing and are wedged between the latter and the disk, we are able to ensure that the moving parts and the actuating system are free from stress arising from the reaction force of the self-tightening action. We have found it to be important, when the brakeshoes bear directly against the brake support or housing in a tightening action, to impart to the actuating means and brakeshoes a so-called "floating effect" whereby wear of the brakeshoes, even if irregular or nonuniform, permits the actuating system to assume various positions relative to the housing in any relative position of the brake levers. Thus, according to the invention, the actuating levers are pivoted to the housing and bear against the respective brakeshoes while the latter are floatingly suspended on the housing (e.g. via the aforementioned spring) so that the levers form a four-point linkage whose four sides, in any given relative position of the levers, can "float" or shift with respect to the housing or brake support while the four sides of this linkage (i.e. the imaginary lines connecting the four pivots) are always of the same length. The brake housing or support can be cast or otherwise formed without finishing of the camming surface thereof or the portions of the housing which bear against the braking plates of the brakeshoes. Avoiding unnecessary finishing work in this manner and the construction of the camming surface integral with the brake housing sharply reduces the cost of the instant brake system by comparison with earlier self-tightening braking arrangements.

According to a further feature of this invention, the mechanically operable brake is mounted in the brake support or housing directly adjacent the hydraulic or pneumatic operating or main brake for engagement with a common brake disk. The close positioning of the main brake and the auxiliary mechanical brake in the common brake housing ensures that bending moments to which the housing or yoke is subjected, are minimal. Advantageously, the housing is open to the exterior while the respective lever is seated in a slot within the backing plate of the brakeshoe so that, upon withdrawal of the actuating lever, the brakeshoe can be withdrawn laterally of the plane of the actuating levers for replacement, examination or repair and without separating the yoke or otherwise disassembling the system.

The above and other objects, features and advantages of the present invention will become more readily apparent from the following description, reference being made to the accompanying drawing in which:

FIG. 3 is a plan view of a portion of the brake of FIG. 1, from a side of the brake housing through which the brakeshoe of the auxiliary brake can be removed;

FIG. 4 is a detail view similar to FIG. 3 showing the mechanically operated brakeshoe in another position;

FIG. 5 is a vector force diagram illustrating some principles of this invention; and FIG. 6 is a plan view of the brake, partly broken away, illustrating the floating character of the lever linkage.

Figure 1:
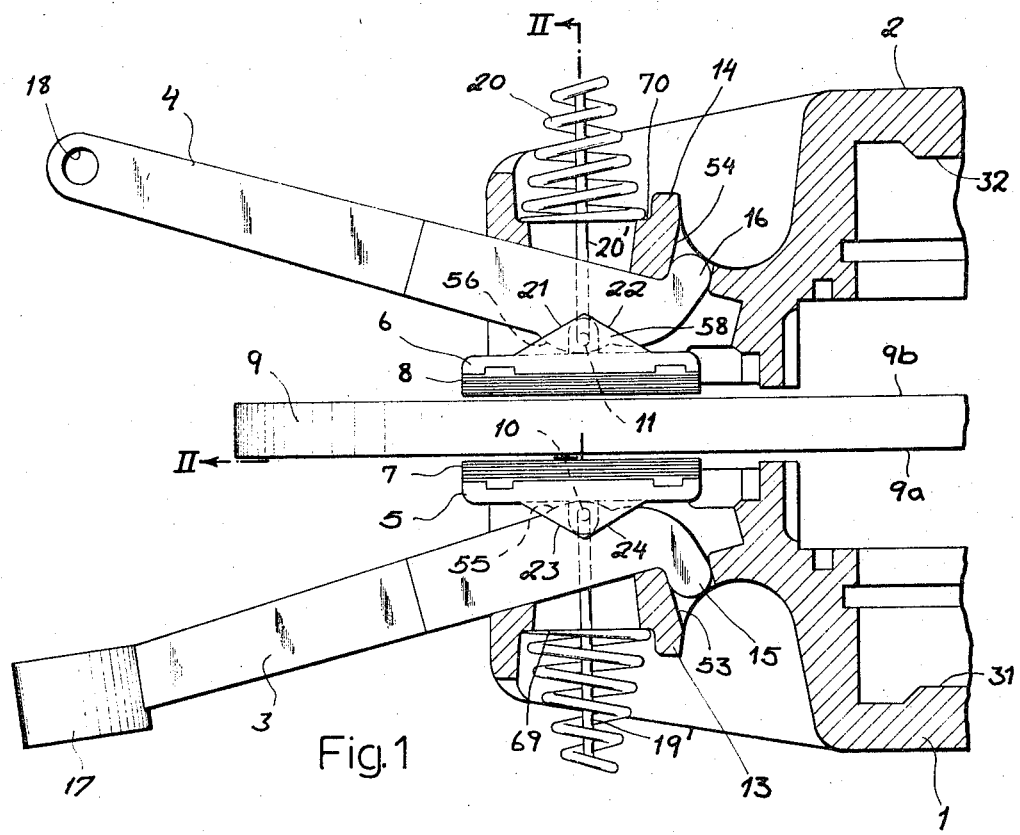
FIG. 1 is a horizontal axial cross-sectional view of a vehicular disk brake, according to this invention.

In the drawing, we show a brake housing in the form of a yoke whose two halves 1 and 2 are interconnected by bolts and may be separated for disassembly of the brake. In the drawing, the yoke halves 1 and 2 are hatched similarly to indicate that they constitute a single housing structure which, insofar as concerns the auxiliary brake, disassembly of the housing is not required for removal of the brakeshoes.

The yoke halves 1 and 2 are provided (FIGS. 1 and 6) with respective hydraulic cylinders 31 and 32 which constitute wheel-brake cylinders of a motor vehicle to the corresponding wheel of which a disk 9 is coupled. The main brake system thus comprises a brake pedal 33 adapted to actuate a master cylinder 34 of the tandem type, the hydraulic networks 35 and 36 of this dual brake system including a cylinder 31 and a cylinder 32 of each of the wheel brakes. Within each cylinder 31, 32, a piston 37, 38 is hydraulically shiftable in a direction perpendicular to the braking faces 9a and 9b of the disk 9, respectively and parallel to the axis A of rotation of this disk. Hydraulic fluid is delivered to the cylinders 31 and 32 via fittings 39 and 40 and the housing 1, 2 may be connected with the axle housing via a flange 41 in the usual manner. Each piston 37, 38 bears against a respective main brakeshoe 42, 43 which carries a lining 44 or 45 frictionally engageable with the disk 9.

Directly adjacent the main brake 31–45, we provide the auxiliary mechanically operable brake system in a laterally open portion 13 or 14 of each yoke half 1, 2. The mechanically operable auxiliary brake thus may serve as a locking brake for immobilizing the vehicle when unattended, as a parking brake for retaining the vehicle in position on slopes or the like, or as an emergency brake for actuation in the event of unforeseen failure of the main brakes or sudden danger. The actuating means of the auxiliary brake comprises a pair of actuating levers 3, 4 whose pivoted extremities 15 and 16 are rounded projections rotatably received in recesses 53, 54 of the brake support portions 13 and 14. The brakeshoes of the auxiliary brake comprise respective backing plates 5 and 6, against which the actuating levers bear with rounded portions 55, 56 and brake linings 7 and 8 confronting the respective faces 9a and 9b of the disk 9. Each backing plate 5 or 6 is formed with a central groove 57 (FIG. 2) in which the bifurcated levers 3, 4 can be received.

The central groove 57 in each backing plate 5, 6 of the brakeshoes of the parking or emergency brake is defined between a pair of generally triangular flanges 58 whose ramp-shaped camming surfaces 21, 22 and 23, 24 are inclined at acute angles to the faces 9a and 9b of the brake disk and co-operate with similarly inclined surfaces 59 and 60 of the housing portions 13 and 14 (FIGS. 3–5). These co-operating camming surfaces form a wedge-like self-tightening means which becomes effective upon entrainment of the brakeshoe (e.g. the brakeshoe 6) in either direction. FIGS. 3 and 4 represent a brakeshoe 6 in its disengaged and engaged positions, respectively, the disk 9 being rotated in the direction of arrow 61.

In the disengaged position of the brakeshoe 6, a spring 20, described in greater detail below, retains the brakeshoe away from the braking surface 9a of the disk 9. When, however, the lever 4 is rotated in the counterclockwise sense, the brake lining 8 is brought to bear against the disk 9 with a force represented in FIG. 5 and applied by the lever 4. The frictional entrainment of the brakeshoe 6 in the direction of arrow 61 causes the ramp surface 22 to ride along the complementary surface 60 of the housing portion 14 and urges the brakeshoe against the disk 9 to a greater extent.

This "self-tightening" action is diagrammatically illustrated in the vector diagram of FIG. 5. In this diagram, the force F applied by the lever 4 in the direction of the disk 9 is supplemented by a force $f$ which is the component of force perpendicular to the braking surface 9a resulting from the frictional entrainment of the shoe 6 with the disk 9. Thus frictional entrainment in the direction of arrow 61 while the housing portion 14 remains fixed, causes a frictional force $f'$ parallel to the braking surface 9a and representing a function of the coefficient of sliding friction and force F. This frictional force applies the surface 22 against the surface 60 so that the effective movement of the shoe 6 is represented at $f''$, parallel to the camming surfaces, and with the component $f$. The braking action is thus augmented.

When the disk rotates in the opposite direction (arrow 62), the surface 21 of the brakeshoe will engage the complementarily inclined surface 59 of the housing 14 and again self-tightening action will operate. The mechanically actuated brakeshoe 5, 7 on the other side 9b of the disk 9, of course, operates in a similar manner. The ramp surfaces 21–24, 59, 60 are so inclined to the disk 9 that the self-tightening action can occur to a considerable extent without self-locking of the inclined-plane wedging surfaces. Thus, the angle included with the disk in the direction of rotation thereof should not be so small as to prevent the springs 19 and 20 from returning the respective brakeshoe along the ramp in the direction of arrow 63 (FIG. 5) when the levers 3, 4 are released.

As can be seen especially in FIGS. 1 and 6, the actuating levers 3 and 4 are provided respectively with a sleeve portion 17 and an eye 18 adapted to be anchored respectively to the sheath 64 and the cable 65 of an actuating device. The latter may include a manually operable or foot-controlled lever 66 disposed adjacent the driver's seat of the vehicle and provided, when necessary, with restoring springs, detent devices or the like, represented at 67 and designed to retain the cable 65 under tension until the lever 66 is released by the vehicle operator. The Bowden line 68 serving as the transmission means for the actuating force, may be replaced, according to this invention, by a rod-type or lever transmission.

As also is apparent from these figures, the brakeshoes 6, 8 and 5, 7 on opposite sides of the disk 9 are held yieldably away from the latter by a pair of conical compression-type coil springs 19 and 20 which are seated in recesses 69 and 70 formed respectively in the housing portions 13 and 14 in line with the brakeshoes 5, 7 and 6, 8. These springs have stems 19' and 20' which pass through the bifurcated actuating levers 3, 4 and have hooks which lock into lugs 10 and 11 provided centrally in the channels or groove 57 of the backing plate 5, 6 of the respective auxiliary brakeshoes.

In the nonactuated condition of the brake, the springs 19 and 20 retain the brakeshoes 5, 7 and 6, 8 away from the disk 9 and the levers 3, 4 are swung outwardly by these springs until they engage wall portions 71 and 72 (best seen in FIG. 6) of the housing or yoke parts 13 and 14. When the lever 66 is actuated, however, the cable 65 is pulled in the direction of arrow 73 relative to the sheath 68 and the levers 3 and 4 are caused to rotate, respectively, in the clockwise and counterclockwise sense, thereby bringing the brakeshoes 5, 7 and 6, 8 in frictional engagement with the disk 9 (see FIGS. 3–5). A self-tightening action ensues. Since the cable or rod actuating system represented at 68 engages the levers 3, 4 at a distance from the pivots 15 and 16 of these levers which is greater than the distance between these pivots and the bearing portions 55 and 56 of the levers, a mechanical advantage is gained in the force applied against the disk 9. The linings 5 and 6 are wedged against the disk 9 in the wedge-shaped gap represented between the respective camming surface 21, 22 or 23, 24 and the surface 9a or 9b of the disk. Upon release of the levers 3, 4, the restoring springs 19 and 20 draw the brakeshoes 5, 7 and 6, 8 back into their original positions.

In order to avoid nonuniform braking forces on the respective sides of the disk, we form the lever system 3, 4 as a floating linkage in the manner best illustrated in FIG. 6. Thus the free ends of the levers 3, 4 are not constrained with respect to the housing except as to their relative spacing as determined by the actuation of the mechanical brake while the pivots 15 and 16 and/or the contact surfaces 55, 56 which are equivalent to pivots, form a four-point linkage which may float or shift with respect to the housing 13, 14 between a normal position I (illustrated in solid lines in FIG. 6) and positions II and III on opposite sides of this normal position and corresponding respectively to greater wear of the brakeshoe 5, 7 and of the brakeshoe 6, 8, respectively. As long as the spacing between the connections 17 and 18 remains constant, the four imaginary sides of this four-point linkage are of constant length. Thus, even if the previous wear of the brakeshoes were nonuniform and tended to cause wobbling thereof, the floating linkage applies the shoes uniformly to the respective brake faces.

Figure 2:
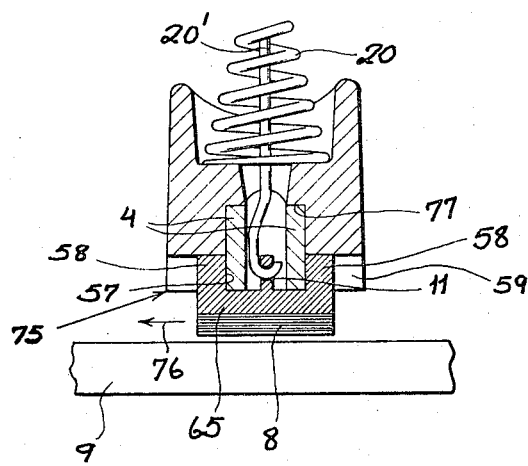
FIG. 2 is a cross-sectional view taken along the line II—II of FIG. 1 in the region of the auxiliary brake suspension.

As can be seen from FIGS. 2–4, the brake yoke 1, 2 is laterally open at 75 so that, upon withdrawal of the lever 4 from the groove 57 of the brakeshoe 6, 8, the latter can be removed in the direction of arrow 76 without disassembly of the system. Furthermore, the groove 57 of the brakeshoe 6, 8, the levers 3 and 4, the groove 77 of the housing 14, the complementary wedging surfaces 21–24, 59 and 60, and the corresponding surfaces of the other yoke portion 13 are unmachined or unfinished.

The invention described and illustrated is believed to admit of many modifications within the ability of persons skilled in the art.

We claim:
1. A disk brake comprising:
a rotatable brake disk;
a brake yoke extending about the periphery of said disk and having a pair of lobes flanking opposite faces of said disk;
a pair of brakeshoes respectively disposed in said lobes and juxtaposed with said disk and mounted for movement transversely of said disk and parallel to said disk relatively to said yoke, each lobe being formed with a respective recess open in the direction of said disk and respectively receiving said brakeshoes, said recesses being formed each with a respective pair of flanks diverging from one another in the direction of said disk while defining a plane of movement of the respective brakeshoe along said disk, said brakeshoes each being formed with a pair of ramps converging away from said disk and generally complementary to the respective flanks of the respective recess and slidably engageable with said flanks;
respective levers each having an end pivotally engaging the respective lobe of said yoke and bearing proximal to said end upon the respective brakeshoe;
respective spring means seated against said yoke and engaging each of said brakeshoes for yieldably drawing same against the respective lever and flanks, away from said disk and into a normal position upon displacement of said brakeshoes toward and along said disk; and
means co-operating with said levers for pivotally displacing same to urge the respective brakeshoes against said disk, said brakeshoes being slidable relatively to said levers along said disk upon frictional engagement of said disk by said brakeshoes whereby said ramps and flanks wedge said brakeshoes more tightly against said disk upon such entrainment.

2. A disk brake as defined in claim 1 wherein said levers form a four-point floating linkage whose sides are of constant length in all positions of said linkage relative to said yoke for a given separation of the other ends of said levers.

3. A disk brake as defined in claim 2 wherein said means co-operating with said levers is a bowden cable having a sheath affixed to the other end of one of said levers and a core wire affixed to the other end of the other of said levers, each lobe of said yoke being formed with a hydraulically pressurizable main brake cylinder, a hydraulically displaceable piston slidably mounted in the respective cylinder for movement in the direction of said disk, and a main brakeshoe between said piston and said disk for engagement therewith upon hydraulic pressurization of the respective cylinder.

4. A disk brake as defined in claim 3 wherein each of said brakeshoes is formed with a support plate lying generally parallel to said disk and having a pair of parallel webs projecting away from said disk and of V-shaped configuration forming said ramps, said spring means each including a conical compression spring having a broad base seated against the respective lobe and converging away from said disk and a rod connected with the end of the spring remote from said disk and extending through the spring into engagement with the respective brakeshoe between the webs thereof, each of said levers bearing upon the respective brakeshoe between the webs therof and having an opening through which the respective rod extends into engagement with the brakeshoe.

5. A disk brake as defined in claim 4 wherein said flanks are of unfinished cast metal.

References Cited

UNITED STATES PATENTS

| 2,790,516 | 4/1957 | Wright et al. | 188—73 |
| 3,003,589 | 10/1961 | Desbrow | 188—73 |
| 3,207,267 | 9/1965 | Beuchle et al. | 188—73 |

FOREIGN PATENTS

| 732,272 | 6/1955 | Great Britain. |
| 960,036 | 6/1964 | Great Britain. |

GEORGE E. A. HALVOSA, *Primary Examiner.*

U.S. Cl. X.R.

188—106